INVENTOR
DOLPHUS H. BLACK
ATTORNEYS

_United States Patent Office_

3,526,865
Patented Sept. 1, 1970

3,526,865
THERMAL RADIATION SENSITIVE THERMOSTAT
Dolphus H. Black, Rte. 4, Arab, Ala. 35016
Filed Mar. 24, 1969, Ser. No. 809,818
Int. Cl. H01h 37/32
U.S. Cl. 337—111       5 Claims

ABSTRACT OF THE DISCLOSURE

A thermostat for sensing radiation heat transfer that is fabricated from a thin, flat metal strip shaped into a sphere. One end of the strip is attached to a rod mounted in a base and the other end of the strip is free and has a contact attached thereto. The contact on the strip is positioned between two contacts mounted on the base so that expansion or contraction of the metal strip will result in one contact on the other end of the metal strip contacting one of the two contacts mouned on the base. The two base mounted contacts are part of a control switch.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The invention relates in general to devices for sensing radiation and in particular the invention is a thermostat having a radiation sensing surface in the form of a sphere. Maintaining a compartment at a comfortable temperature, whether it be a compartment in a space station or a room in a building, is complicated when radiation heat transfer is significant, as it would be when the temperature of the wall surrounding the compartment is higher or lower than the air temperature in the compartment. Studies have determined that an air temperature of 70° Fahrenheit in a compartment is comfortable to a person occupying the compartment if the surrounding walls of the compartment are at the same temperature. However, if the wall temperature were 50° Fahrenheit for example, the air temperature in the compartment would have to be several degrees higher than 70° Fahrenheit for a person in the compartment to be comfortable. If the walls were considerably warmer than 70° Fahrenheit then an air temperature substantially less than 70° Fahrenheit would be required in order to maintain the comfort of a person occupying the compartment. Thus, in order to maintain a compartment at a comfortable temperature it is necessary to employ a thermostat capable of sensing and responding to changes in the temperature of air in a compartment and one that is also responsive to heat gain or loss due to radiation. Thermostats generally available heretofore have ordinarily been capable only of measuring air temperature, and those prior art devices that sensed radiation were considerably more complicated than the present invention.

SUMMARY OF THE INVENTION

The present invention is a radiation sensitive thermostat that includes a thin, flat metallic strip formed into the shape of a sphere. This metal strip is secured at one end to a support rod extending from a base and the other end is free to move when the strip expands due to a temperature change. The free end has a contact formed thereon that is positioned between two contacts of a control switch mounted on the base so that upon expansion or contraction of the metal strip due to a temperature change the contact will engage one of the two contacts of the control switch. This would complete a control circuit to actuate some type of heating or cooling device to condition the air within the compartment. The support rod to which the metal strip is attached is mounted in a base. The base provides a means for mounting the metal strip away from the walls as well as a mounting place for suitable electrical controls like, for example, a control switch.

DETAILED DESCRIPTION OF THE INVENTION

Figure 2:
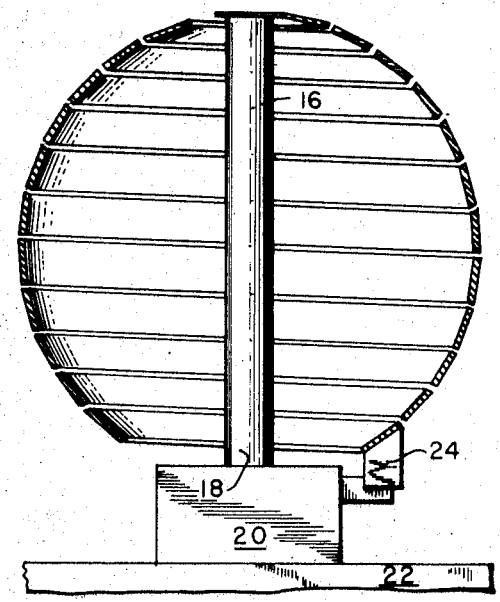
FIG. 2 is a cross sectional view taken along lines 2—2 of FIG. 1.
Figure 1:
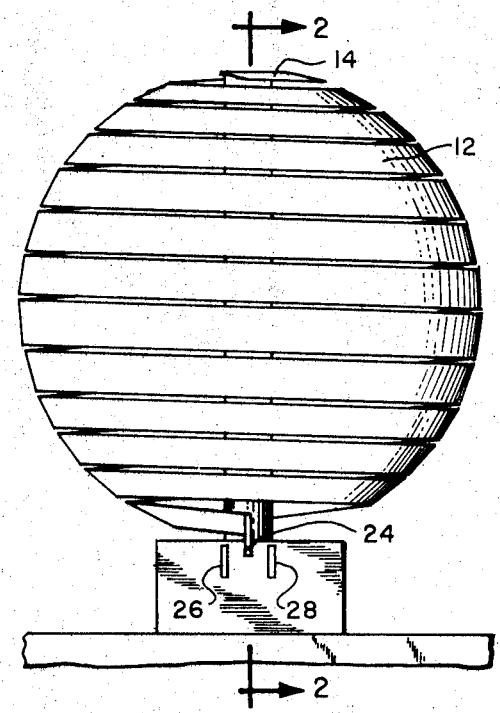
FIG. 1 is a view in elevation of a radiation sensitive thermostat constructed in accordance with this invention.

Referring to FIG. 1, a thermostat is shown that includes a heat sensitive element in the form of a thin continuous metal strip 12 of stainless steel, copper or other suitable material which has been shaped into a sphere. The emissivity of the outer surface of the sphere can be varied by altering the surface finish thereof. One surface expected to be utilized is a polished metal surface. End 14 of the metal strip terminates at approximately the upper pole of the sphere formed by the metal strip and end 14 thereof is connected to the upper end of support rod 16, as shown in FIG. 2. End 18 of the support rod is mounted to a base 20 which in turn is mounted to a wall support 22. The other end of the metal strip making up the expansion skin is free and has an electrical contact 24 mounted thereon. Contact 24 (see FIG. 1) is positioned between contacts 26 and 28 of a control switch (not shown) which would normally be mounted in base 20.

A person's comfort in a compartment depends equally as much on heat transfer due to radiation as it does upon heat transfer due to convection. Convective heat loss or gain results from air currents passing over the body and either gaining or losing heat by absorption when contacting the body. In contrast to this the body can receive radiation from surrounding objects or emit radiation to surrounding objects without warming the intervening air. A body or object normally radiates or receives radiation in all directions and therefore any thermostat that is to be effective in maintaining body comfort must be responsive to radiation and capable of receiving or generating radiation in all directions. The spherical shape of the sensing element of the present invention can radiate or receive radiation in all directions and is therefore affected by any radiation heat exchange that would affect the comfort of a person.

In operation, base 20 is mounted to a wall bulkhead or ceiling such that the sphere or expansion skin formed by the metal strip is positioned well away from the wall. As heat is transferred because of convection (air currents) and radiation, either to or away from the expansion skin, the expansion skin will expand or contract so as to move contact 24 against either contact 26 or contact 28. This would complete a control circuit (not shown) that actuates a system for conditioning the air within the compartment being controlled.

What is claimed is:
1. A radiation sensitive thermostat comprising:
   a metal strip shaped into a sphere, one end of said metal strip terminating in the approximate vicinity of one pole of said sphere and the other end of said metal strip terminating in the approximate vicinity of the other pole of said sphere;
   support means attached to said one end of said metal strip and adapted to be mounted to a structure, whereby the sphere will be supported in a desired position for receiving radiation to be detected; and electrical contact means mounted on said support means in a position to be contacted by said other end of said metal strip upon expansion or contraction thereof due to a temperature change of said metal strip.

2. A thermostat as recited in claim 1 wherein said metal strip is a continuous flat ribbon having a rectangular cross-section.

3. A thermostat as recited in claim 2 wherein one side of said flat ribbon is polished so to provide the sphere formed by said metal strip with a reflective outer surface.

4. A thermostat as recited in claim 1 wherein said support means includes:

a base for mounting said thermostat to a wall;

a shaft having one end attached to said one end of said metal strip and its other end fixed to said base, the longitudinal axis of said shaft coinciding with the polar axis of the sphere formed by said metal strip.

5. The thermostat recited in claim 4 wherein said electrical contact means are a pair of contacts mounted in a spaced relation on said base; and said other end of said metal strip has an electrical contact formed thereon, said metal strip being positioned such that the electrical contact on said other end of said metal strip will be positioned between said pair of contacts mounted on said base.

References Cited

UNITED STATES PATENTS

| | | | |
|---|---|---|---|
| 3,078,717 | 2/1963 | Howard | 73—363.5 |
| 3,040,580 | 6/1962 | Stover et al. | 73—363.5 |
| 1,676,922 | 7/1928 | Phelan | 73—363.5 XR |

BERNARD A. GILHEANY, Primary Examiner

D. M. MORGAN, Assistant Examiner

U.S. Cl. X.R.

73—363.5; 337—379